Aug. 17, 1948.  D. SILVERMAN  2,447,370
AMUSEMENT AND EDUCATIONAL DEVICE
Filed July 19, 1946  2 Sheets-Sheet 1
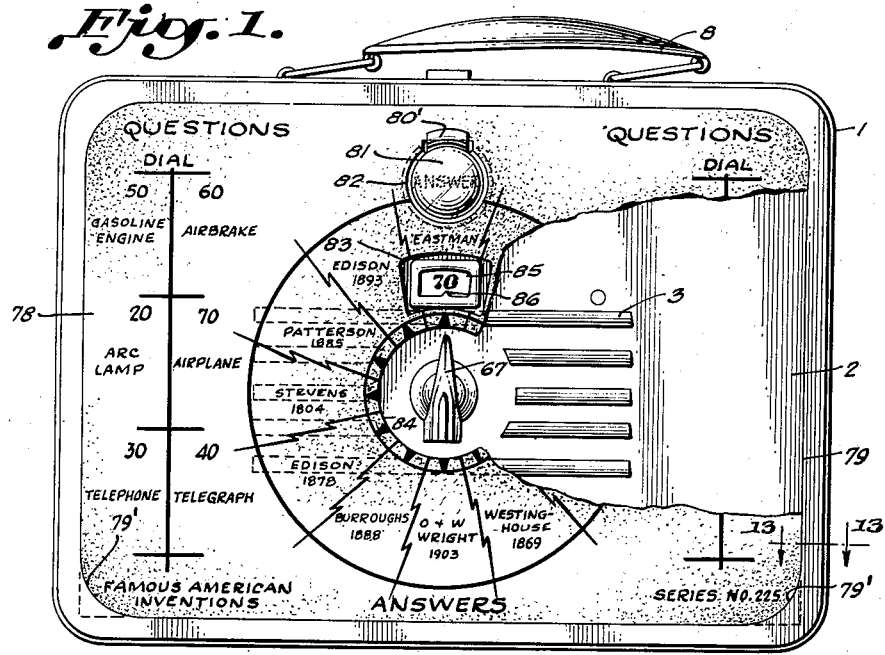
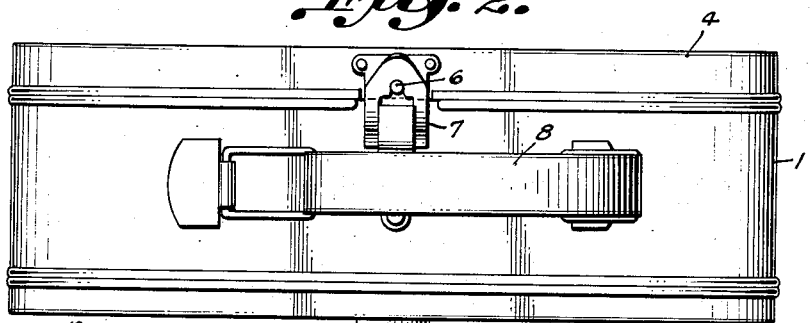
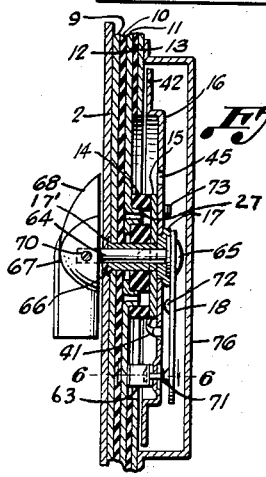
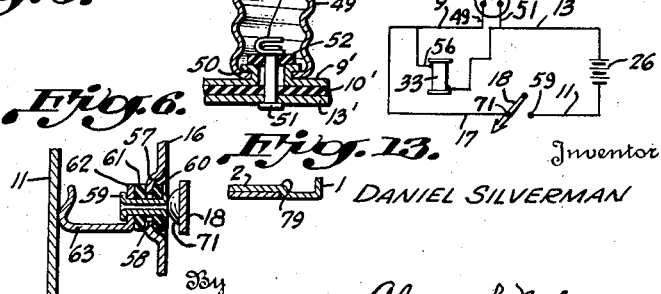
Inventor
DANIEL SILVERMAN
By Almon S. Nelson
Attorney Aug. 17, 1948.                D. SILVERMAN                2,447,370
                      AMUSEMENT AND EDUCATIONAL DEVICE
Filed July 19, 1946                                 2 Sheets-Sheet 2
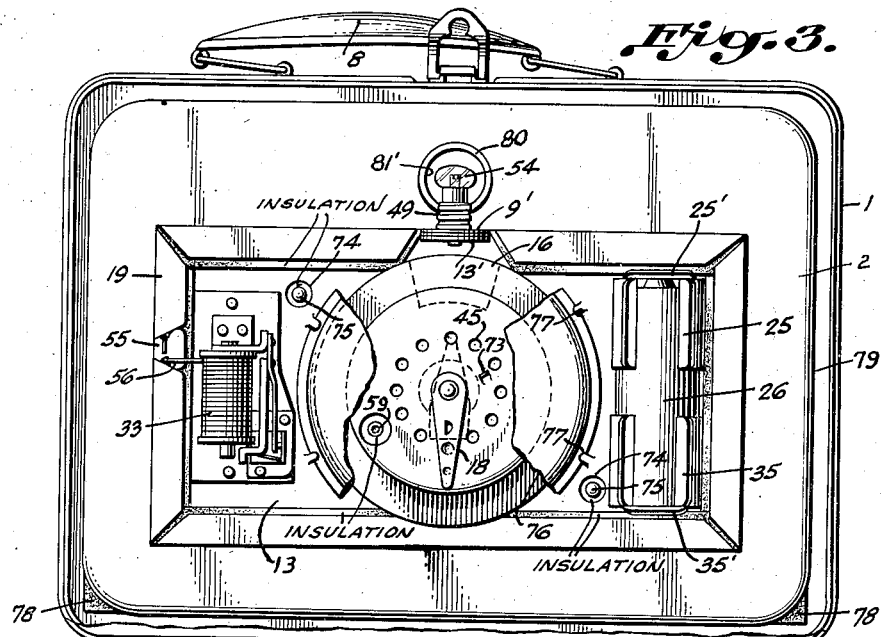
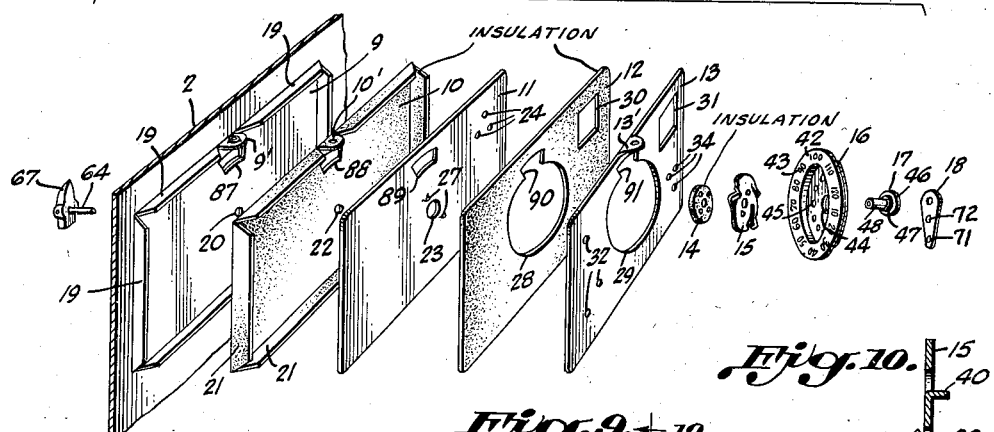
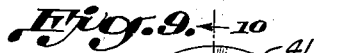
    
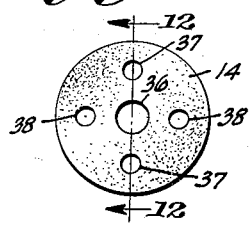        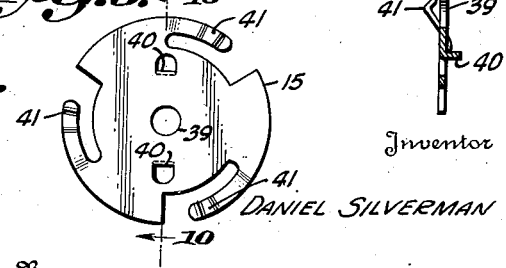
Inventor
DANIEL SILVERMAN
By
Almon S. Nelson
Attorney Patented Aug. 17, 1948

2,447,370

UNITED STATES PATENT OFFICE 2,447,370

AMUSEMENT AND EDUCATIONAL DEVICE

Daniel Silverman, Richmond, Va.

Application July 19, 1946, Serial No. 684,825

5 Claims. (Cl. 35—48)

This invention relates to amusement and educational devices. More particularly, the invention relates to an amusement and educational device of the type producing a visible and/or audible signal when the answer to a given question is indicated.

It is an object of the invention to provide a device of the aforementioned type comprising a cabinet simulating a radio cabinet; said cabinet being provided with a compact electrical unit for producing the signal or signals, a dial, and means for supporting a card on the front face thereof, said card having the questions and answers indicated thereon.

It is a further object of the invention to provide a compact electrical unit for use in a device of the character indicated; said unit comprising a plurality of electrical conducting plates, separated by insulation, which provide not only a means for conducting the electrical energy to the signal or signals, but also provide means for supporting the signal or signals, the dial, switch, and the means for supplying the electrical energy, which in the present instance consists of a dry-cell battery.

A further object of the invention is to provide an electrical unit of the type indicated which can be readily assembled, and, after assembly, all of the parts thereof can be clamped together in one operation to form a compact structure which is substantially free of trouble such as short circuits, loose connections, etc., which are prevalent in electrical devices in which ordinary electric wiring is used.

An additional object of the invention is to provide an electrical unit of the type indicated which substantially eliminates electrical conductors in the form of electric wiring.

Another object of the invention is to provide a compact electrical unit of the character indicated which can be readily tested before assembly with respect to the cabinet.

Another object of the invention is to provide an amusement and educational device of the aforementioned type which eliminates troublesome and complicated gear trains, yet is positive in action, simpler and less expensive to manufacture than devices heretofore known, and, which is efficient and durable in service.

Other objects and advantages of the invention will become apparent as the description proceeds, reference being made to the accompanying drawings wherein:

Fig. 1 is a front elevational view of my amusement and educational device, showing a question and answer card positioned on the front of the housing and partly broken away to illustrate a portion of the front face or wall of the cabinet.

Fig. 2 is a plan view of Fig. 1.

Fig. 3 is a rear elevational view of Fig. 1, parts being broken away to show underlying structure.

Fig. 4 is an exploded perspective view of elements comprising the compact electrical unit.

Fig. 5 is a fragmentary, sectional view illustrating the electrical unit, dial, etc., in assembled relation with the switch in circuit closing position.

Fig. 6 is a fragmentary sectional view taken along the line 6—6 of Fig. 5 looking in the direction of the arrow, Fig. 7 is a diagrammatical view of the electric circuit, Fig. 8 is a fragmentary sectional view of the lamp socket and its connections, Fig. 9 is a plan view of a combination spring and disc retaining element used in the unit, Fig. 10 is a sectional view of the spring and disc retaining element taken on the line 10—10 of Fig. 9 looking in the direction of the arrows, Fig. 11 is a plan view of an insulating washer used in the unit, Fig. 12 is a sectional view of the washer taken on the line 12—12 of Fig. 11 looking in the direction of the arrows, and Fig. 13 is a fragmentary sectional view taken on the line 13—13 of Fig. 1 looking in the direction of the arrows, illustrating the position of the question and answer card relative to the front wall of the cabinet.

Referring now to the drawing, it will be seen that my device comprises a housing or cabinet 1 comprising a front face or wall 2 which is provided with projections 3 simulating the speaker section of the usual metallic radio cabinet, and a rear door 4.

The door 4 is provided with a hinge 5 (Fig. 3) at its bottom, and a pin 6 at its top adapted to be engaged by a pivoted bracket or keeper 7 mounted on the top of the cabinet 1 to maintain the door in closed position.

The top of the cabinet 1 is also provided with a handle 8 rendering the device portable so that it may be readily carried from place to place.

The elements comprising my compact electrical unit are illustrated in exploded relation in Fig. 4, and in assembled relation in Fig. 5.

These elements comprise, in order from front to rear as illustrated in Fig. 4, a first electrically conducting plate 9, an insulating plate 10, a second electrically conducting plate 11, an insulating plate 12, a third electrically conducting plate 13, a fiber insulating washer 14, a combination spring and disc retaining member 15, a disc 16 and an eyelet 17.

A pointer switch 18 completes a circuit between the plates 9 and 11, and a lamp and its socket and/or buzzer and its connections complete a circuit between the plates 9 and 13, all in a manner to be later described.

The plate 9 is slightly larger than the other plates and is provided with inturned flanges 19 along the edges thereof. Also, an inturned tab 9' is provided preferably centrally of the top of the plate 9. The plate 9 also has a small opening 20 located centrally thereof which receives and makes electrical contact with the eyelet 17 as will be more fully described later.

The insulating plate 10 is substantially identical in construction to the plate 9 except that the inwardly directed flanges 21 thereof extend inwardly a slightly greater distance than do the flanges 19. An opening 22 is provided centrally of the plate 10 and this opening registers with the opening 20 and is of substantially the same diameter.

The plate 11 is merely a flat plate provided with a central opening 23 which is somewhat larger than the openings 20 and 22 and in fact is made sufficiently large that it does not come in electrical contact with the eyelet 17 passing therethrough. The plate 11 is provided with three small openings 24 adapted to receive rivets supporting an upper contact bracket 25 (Fig. 3) partially supporting the dry cell battery 26. The plate 11 is also provided with two diametrically opposed rearwardly extending projections 27 for a purpose to be later described.

The plates 12 and 13 are substantially flat plates and are of substantially the same shape. These plates 12 and 13 are provided with relatively large central openings 28 and 29, respectively, and substantially rectangular openings 30 and 31, respectively, through the latter of which the contact bracket 25 extends without making electrical contact with the plate 13.

The plate 13 is provided with suitable openings 32 which are adapted to receive means such as rivets for attaching an audible signal device 33 which may be, if desired, an ordinary buzzer. The plate 13 is further provided with openings 34 adapted to receive suitable means such as rivets for attaching a lower contact bracket 35 (Fig. 3) of the battery supporting means thereto in electrically conducting relationship.

The contact bracket members 25 and 35 comprise end and side fingers and are made of an electrically conducting material such as spring metal whereby the fingers comprising the same may be sprung outwardly to receive the dry cell battery 26 in a well known manner. The end fingers 25' and 35' contact the respective ends of the battery 26.

The fiber washer 14 is preferably cylindrical in shape and is provided with a central opening 36 and two pairs of diametrically opposed openings 37 and 38.

The disc retaining spring member 15 comprises a circular metal plate provided with a central opening 39 and inwardly directed diametrically opposed projections 40. Three L-shaped portions of the member 15 are cut away adjacent the periphery thereof and the remaining strip of metal is bent outwardly and inwardly in substantially a V-shape to provide spring members as will be later described. Preferably three or more of the fingers 41 are provided. If more or less are used, the spacing will obviously be different than 120 degrees.

The disc 16 is preferably of a shallow cup-shape having a radially outwardly directed annular flange 42. The inwardly directed face of the flange 42 is provided with twelve equally spaced indicia 42 comprising the numerals 10, 20, etc., to 120 in substantially the same manner as a radio dial. The bottom of the cup-shaped portion of the disc 16 is provided with a central opening 44 and a plurality of circumferentially extending, equally spaced openings 45 surrounding the central opening 44. In the present instance twelve openings 45 are used, corresponding to the twelve numbers, however, more or less numbers and openings may be used if desired. The total number, however, must be an even number.

The eyelet 17 comprises a rather large head 46, a smaller flange portion 47 and a still smaller tubular portion 48.

The elements 9 to 17 just described are assembled into a very compact electrical unit as follows:

The plate 10 is positioned within the plate 9 and the plate 11 with bracket 25 secured thereto is then positioned on the plate 10. The plates 12 and 13 may then be positioned in order on plate 11 with the signal device 33 and bracket 35 secured to the plate 13. Next, the washer 14 is placed on the plate 11 through the large openings 28 and 29 of the plates 12 and 13, respectively, in such a manner that projections 27 project into the diametrically opposed openings 37, for example. The member 15 is then positioned on the washer 14 with the projections 40 extending into the diametrically opposed openings 38 of the washer 14. The projections 27 prevent rotational movement of the washer 14 and hence the projections 40 extending into the washer 14 prevent rotational movement of the member 15. The disc 16 is next positioned on the spring member 15 and the fingers 41 of the spring 15 project into the openings 45 of the disk 16. With these elements in this position the eyelet 17 is inserted through the central openings of the various elements just described.

The eyelet 17 is then riveted or upset as indicated at 17' (Fig. 5) and the flanges 19 are pressed inwardly to clamp the elements 9 to 17, inclusive, into a compact unit. Both of these operations may be performed at the same time, and it is to be noted that the flanges 21 insulate the flanges 19 of the plate 9 from the plate 13.

The disc 16 is rotatably mounted upon the flange portion 47 of the eyelet 17. In the clamping operation the tab 9 is not pressed downwardly and a corresponding insulating tab 10' on the plate 10 separates the tab 9' from a corresponding tab 13' on the plate 13.

As more clearly shown in Fig. 8, the tabs 9', 10', and 13' support a lamp-receiving socket 49 which is suitably secured by means of an inwardly directed eyelet 50 in electrical contact with the tab 9' and plate 9. A rivet 51 extends upwardly from the tab 13 in electrical contact therewith through the eyelet 50 and an insulating washer 52 positioned thereabove. The rivet 51 is of smaller diameter than the eyelet 50 so that there can be no electrical contact therebetween, and at its upper end the rivet 51 passes through a spring 53 supported on the washer 53 which leads to one side of the lamp filament.

The lamp socket 49 receives a lamp 54 (Fig. 3)

and one side of the audible signal 33 is in electrical contact with the plate 13 to which it is attached and the other side thereof is electrically connected to a tab 55 formed in a flange 19 of the plate 9 by means of a very short electrical wire connection 56.

Referring now to Figs. 5 and 6, it will be noted that the disc 16 is also provided, in the bottom of its cup-shaped portion with a recess 57 having an opening 58 extending therethrough. An electrical contact element in the form of an eyelet 59 extends through said opening in spaced relation to the disc 16, and also through insulating washers 60 and 61, one on each side of the disc 16, and through a flange 62 of a sweep contact element 63. The element 63 extends through the openings 28 and 29 of the plates 12 and 13, respectively, to the plate 11 thereby providing electrical communication between the plate 11 and the contact element 59.

A shaft 64 is rotatably mounted in the eyelet 17. The shaft preferably has a reduced end portion (not shown) over which the switch arm 18 is placed and securely riveted thereto as indicated at 65, Fig. 5.

The shaft 64 extends through the front face or wall 2 of the housing 1 through a suitable opening 66 therein, and at its forward end receives an indicator 67. The pointer 68, of the indicator 67, is angularly spaced 180 degrees from the pointer switch 18 and a set screw 70 securely fastens the indicator 67 to the shaft 64. Preferably an opening or flattened portion (not shown) is provided 90 degrees from the pointer switch to receive the set screw to provide means for quickly and accurately positioning the indicator 67 on the shaft 64.

The switch 18 is provided with a contact point or element 71 which engages the contact eyelet 59 mounted in the disc 16. Due to the recess 57, the eyelet contact 59 is flush with the rear face of the disc 16. The switch arm 18 is also provided with an inwardly directed lug 72 which engages an outwardly or rearwardly directed projection 73 on the rotatable disc 16. The projection 73 is preferably spaced 180 degrees from the eyelet contact 59 and when engaged by the lug 72 provides a means whereby the disc may be rotated by the indicator 67.

Referring now to Figs. 3, 4, 7 and 8, and assuming that the switch contact 71 is in engagement with the contact eyelet 59, the electric circuit is as follows:

From the battery 26 through finger 35' to plate 13; thence direct to the audible signal 33 and through wire 56 to plate 9, and parallel therewith, through tab 13', rivet 51, spring 53, lamp 54, socket 49 to the plate 9; from the plate 9, through the eyelet 17 and shaft 64 to the switch arm 18, contact point 71, eyelet 59, sweep contact member 63, plate 11 and finger 25' to the other side of the battery 26.

Any suitable means may be used to mount my compact electrical unit to the wall 2 of the housing 1. As illustrated in Fig. 3, relatively large openings 74 may be provided in the metal plates 13, 11 and 9, and relatively small screws 75 extended therethrough and through the wall 2 of the housing.

To prevent tampering with the rotatable switch 18 and dial 16, a cup-shaped housing 76 may be provided and secured to the plate 13 by up-struck tabs 77.

Any number of question and answer cards may be used with my device, and with twelve openings 45 and twelve numbers 10, 20, etc., to 120 on the disc, twelve questions and twelve answers may be associated with each card. The questions and answers on the cards may relate to inventions, history, geography, etc.

The card 78 illustrated in Fig. 1 relates to inventions, and each question thereon is associated with a number such as 20, 70, etc. The card is provided with a central opening 84 through which the indicator 67 extends, and the twelve answers to the questions are equally spaced at 30 degree intervals around the opening 84.

The card 78 is also provided with a dial viewing opening 83, and an opening 82 through which a translucent, colored, lens 81 extends.

The front face or wall 2 of the cabinet 1 is recessed as indicated at 79, and the lower corners thereof are provided with slits 79' to receive and support the card 78.

The lens 81 has the word "Answer" embedded therein and is mounted in a suitable opening 81' in the wall 2 in front of the lamp 54 and may be secured therein by means of an eyelet 80 having an upwardly directed tab 80' which also supports the card 78.

In placing a card 78 on the face 2 of the cabinet, the opening 82 is placed over the tab 80' and then the lower corners of the card are inserted into the slits 79'.

The wall 2 has an opening 85 provided with a pointer 86 through which the indicia on the disc 16 may be viewed, and registering therewith, for the same purpose, are openings 87, 88, 89, 90 and 91 in the plates 9, 10, 11, 12 and 13, respectively.

In operation, a card 78 is positioned on the wall 2 and a question is selected. The indicator 67 is then turned, and through the lug 72 and projection 73 the disc is also turned, until the number associated with the question is indicated by the pointer 86. Then the indicator 67 is turned in the reverse direction until the signal means are energized, approximately 180 degrees since the eyelet 59 and projection 73 are so spaced, at which time the indicator 67 will be pointing to the correct answer on the card 78.

In the position illustrated in Fig. 1, the question relating to the inventor of the airplane has been selected, and the numeral 70 associated therewith has just been turned to the pointer 86. It will be noted that (reverse) rotation of the indicator 67 through 180 degrees will designate "O & W Wright, 1903," and also, the signals will be energized as previously described.

As the disc 16 is rotated due to engagement of its projection 73 by the lug 72 of the switch arm 18, the spring fingers 41 move into and out of the openings 45. Upon reverse rotation of the indicator 67, after the desired number is indicated by the pointer 86, the fingers 41 projecting into the openings 45 prevent rotation of the disc. Preferably three or more fingers 41 are provided to properly balance the disc 16.

Obviously more or less questions and answers than twelve on each card can be used if desired. If twenty-four are used, for example, it is only necessary to provide twenty-four equally spaced openings 45, twenty-four equally spaced numbers on the disc 16 instead of twelve as disclosed herein, and twenty-four answers at 15 degree intervals on the cards.

Also, it is not necessary to have the pointer 68 of the indicator 67 spaced 180 degrees from the switch 18, but when so constructed, 180 degrees of indicator play is always provided regardless of which way the indicator 67 is turned to obtain the desired number at the pointer 86. If spaced differently, more or less indicator play would be provided, depending upon which direction the indicator was turned to obtain the number at the pointer 86.

It will also be obvious that either one of the signal means 33 or 54 may be omitted if desired, however, both are preferred.

It is also to be noted that my compact electrical unit may be readily tested just before assembly with respect to the cabinet. With the battery 26 in place, the shaft 64 carrying the switch 18 is merely passed through the eyelet 17 and the switch 18 is moved to the contact eyelet 59. If everything is in order, the signal means will be actuated as soon as the switch contact 71 engages the contact eyelet 59.

While the invention is susceptible of various modifications and alternative constructions, I have shown in the drawings and have herein described in detail the preferred embodiment, but it is to be understood that I do not thereby intend to limit the invention to the specific form disclosed, but intend to cover all modifications and alternative constructions falling within the spirit and scope of the invention as expressed in the appended claims.

I claim:

1. An educational device of the type described, comprising a cabinet, an electrical unit in said cabinet, said unit comprising first, second and third electrically conducting plates, insulation between said plates, a signal electrically connected between said first and third plates, a battery electrically connected between said second and third plates, a disc having indicia thereon spaced from said third plate by insulating means, an eyelet extending through said plates and disc, said second and third plates being spaced from said eyelet, said disc being rotatable on said eyelet, a rotatable shaft extending through said eyelet and cabinet, a switch rotatable with said shaft and associated with said disc, a pointer rotatable with said shaft outwardly of the cabinet, an electric contact element secured to said disc and extending to said second plate, said contact element being insulated from said disc, said switch being adapted to engage said contact, a projection on said disc, said projection being angularly spaced from said contact element, a lug on said switch adapted to engage said projection, and a card removably mounted on said cabinet, said card being associated with said pointer and having indicia thereon.

2. An educational device of the type described, comprising a cabinet, an electrical unit in said cabinet, said unit comprising first, second and third electrically conducting plates, means insulating said plates from each other, a signal electrically connected between said first and third plates, a source of electric current connected between said second and third plates, a disc having indicia thereon, means insulating said disc from said third plate, an eyelet extending through said disc and plates, said second and third plates being spaced from said eyelet, a rotatable shaft extending through said cabinet and eyelet, a switch secured to said shaft and associated with said disc, an indicator removably secured to said shaft, an electric contact element secured to said disc, a sweep element secured to said contact element and extending to said second plate, said contact element being insulated from said disc, said switch being adapted to engage said contact, means for rotating said disc, and a card removably mounted on said cabinet, said card being associated with said indicator and having indicia thereon.

3. An educational device of the type described, comprising a cabinet, an electrical unit in said cabinet, said electrical unit comprising first, second and third plates insulated from each other, a signal connected between said first and third plates, a source of electric current supported by and in electrical contact with said second and third plates, a rotary disc having indicator means associated therewith, means controlled by said indicator means for establishing an electric current through said plates and signal, and a card removably mounted on said cabinet, said card being associated with said indicator means and having indicia thereon.

4. In an educational device of the type described, an electrical unit comprising first, second and third electrical conducting plates, an insulating plate between said first and second and said second and third plates, all of said plates having openings extending therethrough in registration with each other, the opening in said second plate being larger than the opening in said first plate, and the openings in said third plate and the insulating plate between said second and third plates being greater than the opening in said second plate, a disc having an opening therein, an insulating washer having an opening therein spacing said disc from said third plate, an eyelet extending through the openings in said disc, washer and plates, said disc being rotatably mounted on said eyelet and provided with a sweep contact member insulated therefrom extending to said second plate, flanges on said first plate and said insulating plate between said first and second plates embracing said other plates, second openings in said third plate and the insulating plate between said second and third plates, a battery bracket secured to said second plate and extending through said last mentioned openings, and a second battery bracket cooperating with said first bracket secured to said third plate.

5. In an educational device of the type described, an electrical unit comprising first, second and third electrical conducting plates, insulating means between said plates, a rotatable disc insulated from said second and third plates and provided with a sweep contact member insulated therefrom extending to said second plate, means securing said disc, washer and plates together to form a compact unit, battery brackets secured to said second and third plates, respectively, a signal connected between said first and third plates, and means for electrically connecting said first and second plates including a switch adapted to contact said sweep contact member.

DANIEL SILVERMAN.

REFERENCES CITED

The following references are of record in the file of this patent:

UNITED STATES PATENTS

| Number | Name | Date |
|---|---|---|
| 1,686,105 | Rothenberg | Oct. 2, 1928 |
| 1,948,712 | Hornung | Feb. 27, 1934 |
| 1,968,123 | Bricken | July 31, 1934 |

FOREIGN PATENTS

| Number | Country | Date |
|---|---|---|
| 445,052 | Great Britain | Apr. 2, 1936 |